United States Patent [19]

Albizzati et al.

[11] Patent Number: 5,082,817

[45] Date of Patent: Jan. 21, 1992

[54] CATALYSTS FOR THE POLYMERIZATION OF OLEFINS

[75] Inventors: Enrico Albizzati, Arona; Luigi Resconi, Milan, both of Italy

[73] Assignees: Ausimont S.r.l., Milan, Italy; Hilmont Incorporated, New Castle County, Del.; Montedison S.p.A., Milan, Italy

[21] Appl. No.: 641,336

[22] Filed: Jan. 15, 1991

Related U.S. Application Data

[63] Continuation of Ser. No. 275,128, Nov. 22, 1988, abandoned.

[30] Foreign Application Priority Data

Nov. 27, 1987 [IT] Italy .............................. 41013 A/87

[51] Int. Cl.$^5$ ............................................. C08F 4/64
[52] U.S. Cl. .................................. 502/102; 502/117; 502/134; 526/113; 526/118
[58] Field of Search ..................... 502/102, 117, 134

[56] References Cited

U.S. PATENT DOCUMENTS

| | | | |
|---|---|---|---|
| 3,135,809 | 6/1964 | Bosmajian | 502/103 X |
| 3,173,902 | 3/1965 | Carrick et al. | 502/102 X |
| 3,520,826 | 7/1970 | Tanaka et al. | 502/102 |
| 4,298,718 | 11/1981 | Mayr et al. | 502/134 X |
| 4,408,019 | 10/1983 | Blunt | 526/118 X |
| 4,476,289 | 10/1984 | Mayr et al. | 502/134 X |
| 4,659,685 | 4/1987 | Coleman et al. | 502/102 X |

FOREIGN PATENT DOCUMENTS

| | | | |
|---|---|---|---|
| 0568580 | 11/1960 | Belgium | 502/102 |
| 1184592 | 3/1970 | United Kingdom | 502/102 |

OTHER PUBLICATIONS

Rideal, *Concepts in Catalysis* (1968), pub. by Academic Press, p. 5.

*Primary Examiner*—Patrick P. Garvin
*Attorney, Agent, or Firm*—Stevens, Davis, Miller & Mosher

[57] ABSTRACT

Catalysts for the polymerization of olefins, obtained by means of the reaction of:
a) a compound of a transition metal containing at least one metal-halogen linkage, supported on a magnesium halide in the active form, with
b) a compound of Ti, Zr or Hf, containing at least one metal-carbon linkage.

5 Claims, No Drawings

CATALYSTS FOR THE POLYMERIZATION OF OLEFINS

This application is a continuation of application Ser. No. 07/275,128, filed Nov. 22, 1988 and now abandoned.

The present invention relates to novel catalysts for the polymerization of olefins, and to their use in the polymerization of $$CH_2=CHR$$

olefins, wherein R is hydrogen, or an alkyl radical of from 1 to 8 carbon atoms, or an aryl radical.

Polymerizing olefins with catalytic systems of Ziegler/Natta type, obtained by reacting a compound of a transition metal supported on Mg halides in the active form with an organometallic compound of from the $I^{st}$ to the $III^{rd}$ groups of the periodic system, is known.

The use is known as well, as disclosed in U.S. Pat. No. 4,408,019, of a catalytic system formed by $TiCl_3$, and comprising such compounds as $R_2TiCp_2$ as co-catalysts, in order to obtain ethylene/propylene block copolymers.

In the technical literature [K. Saga, Makromol. Chem. Rapid Commun. 8 273-276)], catalysts for propylene polymerization are furthermore described, which comprise as their solid catalytic component a Ti halide supported on a magnesium halide, and, as the co-catalyst, a titanium-alkyl compound of formula $$(RCp)_2TiMe_2$$

(wherein R=H, Me; Me=methyl; Cp=cyclopentadienyl), or Tebbe's complexes, of formula $$(MeCp)_2TiCH_2—(CH_3) AlMe_2.$$

However, the above described catalysts are not endowed with a high activity.

The present Applicants have unexpectedly found now that it is possible to obtain catalytic systems highly active in the (co)polymerization of olefins, which contain, as the co-catalysts, Ti, Zr of Hf compounds containing at least one metal-carbon linkage, and, in particular, compounds of formula $$MR_nX_{4-n}$$

wherein:
M=Ti, Zr;
R=—$CH_3$, —$CH_2$—$SiR'_3$, —$CH_2$—$CR'_3$, —$CH_2$-aryl, —$CH_2$—CH=$CH_2$, with:
  R'=a linear or branched alkyl radical containing from 1 to 10 carbon atoms;
X=halogen, —OR, —$NR_2$, Cp, wherein
  Cp=$C_5R''_5$, indenyl, with
  R''=H, an alkyl radical of from 1 to 6 carbon atoms,
n=a numeral of from 1 to 3
if, as the solid catalytic component, the product is used, which is obtained by supporting a compound of a transition metal, and possibly an electron-donor compound, on a magnesium halide in the active form, and having a porosity of at least 0.2 cc/g.

As the metal transition compounds, compounds of Ti, Zr and V, containing at least one metal-halogen linkage, are used.

Examples of such compounds are the halides of Ti, Zr and V. Preferred compounds are $TiCl_3$, $TiCl_4$, Ti haloalkoxides, $VCl_3$, $VOCl_3$.

The preferred organometallic compounds are Zr compounds of formula $$ZrR_nX_{4-n},$$

wherein R, X and n have the hereinabove defined meaning.

As already said, the solid catalytic components can also comprise, besides the metal transition compound, an electron-donor compound containing at least one N, O, S, or P atom. The halides of magnesium in the active form are characterized by an X-rays diffraction spectrum, in which the most intense line appearing in the spectrum of the corresponding halides in a non-active state (having a surface area of about 1 m²/g) is replaced by a halo having its intensity maximum shifted relatively to the interplanar distance of said line. Examples of catalytic components are disclosed in French patents Nos. 2,332,288 and 2,361,423, U.S. Pat. Nos. 4,156,063, 4,107,413, 4,107,414, 4,187,196, 4,336,360 and European patent applications Nos. 45,975, 45,976 and 45,977.

The porosity of the catalytic component (as determined by the BET method) is preferably higher than 0.3 cc/g, and is generally comprised within the range of from 0.3 to 0.9 cc/g.

The electron-donor compounds are selected in particular from among the esters of oxygen-containing acids, acid halides, ketones, aldehydes, alcohols, ethers, thioethers, amides, lactones, phosphines, phosphoramides, silicon compounds, such as alkoxy-silanes.

Among the esters, particularly suitable are the alkyl esters of the mono- or poly-carboxy aromatic acids, in particular the alkyl esters of benzoic acid, anisic acid, toluic acid and phthalic acid.

The present Applicants have found also, and this is a particular aspect of the catalysts according to the present invention, that in case of polymerization of propylene, and of similar a-olefins, polymers having a high isotacticity index can be obtained, also without the compounds used as the co-catalysts being modified with electron-donor compounds the compounds used as the co-catalysts. In this case, the only present electron-donor compounds are those contained in the solid catalytic component.

Examples of Ti, Zr and Hf compounds which can be used as the co-catalysts are:

Ti(CH$_2$C$_6$H$_5$)$_4$, Ti(CH$_2$C$_6$H$_4$-pCH$_3$)$_4$, TiCl$_2$(CH$_2$C$_6$H$_5$)$_2$,
Ti[CH$_2$C(CH$_3$)$_2$C$_6$H$_5$]$_4$, Ti(CH$_3$)$_4$, Ti[CH$_2$C(CH$_3$)]$_4$,
Ti[CH$_2$Si(CH$_3$)$_3$]$_4$, Ti(CH$_2$CH=CH$_2$)$_4$, Ti(C$_5$H$_6$)$_2$,
Ti(C$_9$H$_7$)$_2$(CH$_3$)$_2$,
Zr(CH$_2$C$_6$H$_5$)$_4$, Zr(CH$_2$C$_6$H$_4$-pCH$_3$)$_4$, ZrCl(CH$_2$C$_6$H$_5$)$_3$,
ZrCl$_2$(CH$_2$C$_6$H$_5$)$_2$, Zr[CH$_2$C(CH$_3$)$_2$C$_6$H$_5$]$_4$, Zr(C$_5$H$_5$)$_2$(CH$_3$)$_2$,
Hf(CH$_2$C$_6$H$_5$)$_4$, Hf[(CH$_3$)$_2$(C$_6$H$_5$)]$_4$,

The molar ratio of the metallorganic compound of Ti, Zr or Hf to the compound of the transition metal supported on the magnesium halides is generally comprised within the range of from 1 to 1,000; and is preferably higher than 50.

The catalysts according to the present invention can be used in particular for the polymerization of monomers of formula $$CH_2=CHR,$$

wherein R is hydrogen or a $(C_1-C_8)$-alkyl or an aryl, in particular, ethylene, propylene, 1-butene, 4-methyl-1-pentene and styrene, as well as mixtures of such monomers with one another and/or with dienes, in particular ethylenepropylene mixtures with a non-conjugated diene.

The polymerization processes are carried out according to known methods, in the liquid phase, in the presence, or in the absence, of an inert hydrocarbon solvent, or in the gas phase.

The following examples are given for the purpose of illustrating the invention without limiting it.

EXAMPLES

Propylene Polymerization

To an autoclave of stainless steel of 2 liters of capacity, a suitable amount of a solid catalytic component suspended in 700 ml of n-heptane containing the compound of transition metal of general formula $MR_nX_{n-4}$ is charged at 40° C. under a propylene stream. The autoclave is sealed, an overpressure of 0.2 atm of $H_2$ is introduced, the total pressure is increased up to 7 atm with propylene, and the temperature is increased up to 60° C. The polymerization is carried out, with a continuous feed of monomer, for 2 hours.

The amounts of the solid catalytic component, the type and the amounts of the compounds $$MR_nX_{4-n}$$

employed in polymerization as well as the results of the polymerization tests are reported in Table 1.

The catalytic component used in this test series is prepared as follows.

Examples 1-3

86.8 g of anhydrous $MgCl_2$ and 19.3 g of ethyl benzoate are co-ground under a nitrogen atmosphere for 60 hours in a vibrating mill of VIBRATOM type by SHEBTECHNIK, having a total volume of 1,000 cc, and containing 3.486 kg of stainless-steel balls of 15.8 mm of diameter.

25 g of the co-ground product is reacted with 210 cc of $TiCl_4$, for two hours at 80° with stirring. The excess of $TiCl_4$ is then removed by filtration at 80° C. This treatment is repeated once more.

The filter panel is ten washed five times with hexane at 65° C., with 200 ml of hexane being used each time. The so-obtained solid is dried under vacuum.

The titanium and ethyl benzoate contents, the surface area and the porosity of the so-prepared solid catalytic components are reported in Table 1.

Example 4

To a 1,000-ml flask, 229 ml of $TiCl_4$ is charged, and is allowed to react with 2.42 ml of ethyl benzoate at 16° C. for 10 minutes. At the same temperature, a suspension is then added dropwise over a time of 50 minutes, which contains, in 25 ml of n-heptane, 18 g of $MgCl_2.3C_2H_5OH$, as microspheres of 50 microns of average diameter.

When the addition is ended, the temperature is increased up to 100° C., and the reaction is allowed to complete over a 2-hours time. The reaction mixture is filtered on a porous septum at the reaction temperature, 100 ml of pure $TiCl_4$ is added, and the reaction is allowed to proceed for a further 2 hours at 120° C. The reaction mixture is filtered and the filter panel is washed at 80° C. with n-heptane, until in the filtrate no chloride ions are any longer present.

ETHYLENE POLYMERIZATION

To an autoclave of stainless steel of 2 liters of capacity, a suitable amount of a solid catalytic component suspended in 1,000 ml of n-heptane containing the compound of transition metal $MR_nX_{n-4}$ is charged at 60° C. under vacuum.

The autoclave is sealed, 5 atmospheres of $H_2$ is introduced, the total pressure is increased up to 15 atm with ethylene, and the temperature is increased up to 70° C. The polymerization is carried out, with the monomer being continuously fed, for 2 hours.

The amounts of the solid catalytic component, the type and the amounts of the compound $$MR_nX_{4-n}$$

as well as the results of the polymerization tests are reported in Table 2.

The preparation of the catalytic component used in ethylene polymerization is carried out as follows.

Examples 5-7

To a 1,000-ml flask, 229 ml of $TiCl_4$ is charged, and the temperature is reduced to 15° C. At the same temperature, a suspension is then added dropwise over a time of 60 minutes, which contains, in 25 ml of n-heptane, 18 g of $MgCl_2.3C_2H_5OH$, as microspheres of 50 microns of average diameter.

When the addition is ended, the temperature is increased up to 100° C., and the reaction is allowed to complete over a 2-hours time. The reaction mixture is filtered on a porous septum at the reaction temperature, 100 ml of pure $TiCl_4$ is added, and the reaction is allowed to proceed for a further 2 hours at 120° C. The reaction mixture is filtered and the filter panel is washed at 80° C. with n-heptane, until in the filtrate no chloride ions are any longer present.

COMPARATIVE EXAMPLE

The solid catalytic component used in the present Example is obtained by grinding for 24 hours in a vibrating mill of 1 liter of capacity containing 2.5 kg of stainless-steel balls of 16 mm of diameter, 60 g of a mixture of $TiCl_4$ and anhydrous $MgCl_2$, in such a proportions as to have a titanium content of 2% by weight.

ETHYLENE/PROPYLENE COPOLYMERIZATION

To a stainless-steel autoclave of 2 liters of capacity, 600 g of propylene and ethylene is charged at 20° C., up to a total pressure of 13.3 atm. After a 15-minutes stirring, through a steel syringe, and under an argon pressure, a suspension is charged, which contains 50 mg of a catalytic component prepared as in Examples 5-7, and 600 mg of $Zr(CH_2C_6H_5)_4$ in 30 ml of toluene. The reaction of polymerization is allowed to proceed for 1 hour, then unreacted propylene is vented off, and 125 g of polymer is isolated, which corresponds to a yield of 2,500 g of polymer/catalyst g, with the following properties:
cristallinity Rx=3%;
propylene content=40.4% by weight;
$\eta$=6.2 dl/g.

TABLE 1

| Example No. | SOLID CATALYTIC COMPONENT | | | | | CO-CATALYST | | POLYMERIZATION | | |
|---|---|---|---|---|---|---|---|---|---|---|
| | Ti (%) | Ethyl benzoate (%) | S.A. (m²/g) | Porosity (cc/g) | mg | Formula | mg | Yield (kg of PP/g of catalyst) | II (%) | $\eta$ (dl/g) |
| 1 | 1.5 | 6.0 | 176 | 0.40 | 233 | ZrBz$_4$ | 538 | 2.7 | 92.7 | 1.7 |
| 2 | 1.5 | 6.0 | 176 | 0.40 | 299 | In$_2$ZrMe$_2$ | 321 | 2.6 | 94.9 | 1.9 |
| 3 | 1.5 | 6.0 | 176 | 0.40 | 410 | TiBz$_4$ | 618 | 1.5 | 90.0 | 2.2 |
| 4 | 2.5 | 8.0 | 338 | 0.9 | 304 | TiBz$_4$ | 780 | 3.2 | 98.2 | 1.9 |

Me = Methyl
Bz = Benzyl
In = Indenyl

TABLE 2

| Example No. | SOLID CATALYTIC COMPONENT | | | | CO-CATALYST | | POLYMERIZATION | |
|---|---|---|---|---|---|---|---|---|
| | Ti (%-wt.) | S.A. (m²/g) | Porosity (cc/g) | mg | Formula | mg | Yield (HDPE kg/catalyst g) | $\eta$ (dl/g) |
| Comparative Example | 2 | 57 | 0.08 | 191 | ZrBz$_4$ | 316 | 0.71 | 4.7 |
| 5 | 8.25 | 376 | 0.31 | 10 | ZrBz$_4$ | 390 | 27.5 | 5.7 |
| 6 | 8.25 | 376 | 0.31 | 17 | TiBz$_4$ | 310 | 11.0 | 3.8 |
| 7 | 8.25 | 376 | 0.31 | 21 | Me$_2$Ticp$_2$ | 270 | 7.5 | 3.2 |

Me = Methyl
Bz = Benzyl
Cp = Cyclopentadienyl

We claim:
1. Catalysts for the (co)polymerization of olefins, which contain the product of the reaction of:
   a) a solid catalytic component having a porosity of at least 0.2 cc/g., comprising a compound of Ti or Zr with at least one metal-halogen linkage, and optionally an electron-donor compound, supported on an anhydrous magnesium halide in the active form, having an X-ray diffraction spectrum in which the most intense line appearing in the spectrum of the corresponding halide in a non-active state having a surface area of about 1 m²/g is replaced by a halo having its intensity maximum shifted relatively to the interplanar distance of said line, with;
   b) a compound of Hf, Ti or Zr, containing at least one metal-carbon linkage, of the formula:

MR$_n$X$_{4-n}$ wherein:
   M=Hf, Ti, or Zr,
   R=—CH$_3$, —CH$_2$—SiR'$_3$, —CH$_2$—CR'$_3$, or —CH$_2$-aryl, with R'=a linear or branched alkyl radical containing from 1 to 10 carbon atoms;
   X=halogen, —OR, or —NR$_2$; and
   n=a numeral of from 1 to 4.

2. Catalysts according to claim 1, wherein the (b) component is a zirconium compound selected from the group consisting of Zr(CH$_2$C$_6$H$_4$—pCH$_3$)$_4$, ZrCl(CH$_2$C$_6$H$_5$)$_3$, ZrCl$_2$(CH$_2$C$_6$H$_5$)$_2$, and Zr[CH$_2$C(CH$_3$)$_2$C$_6$H$_5$]$_4$.

3. Catalysts according to claim 1, wherein the solid catalytic component has a porosity within the range of from 0.3 to 0.9 cc/g.

4. Catalysts according to claim 1, wherein the transition metal compound supported on magnesium halide is a Ti halide.

5. Catalysts according to claim 1, wherein the solid catalytic component comprises an electron-donor compound selected from the group consisting of esters of the aromatic acids.

* * * * *